United States Patent [19]
Richard

[11] 3,866,543
[45] Feb. 18, 1975

[54] SWING DECK LOCKING DEVICE

[75] Inventor: James W. Richard, Denison, Tex.

[73] Assignee: Missouri-Kansas-Texas Railroad Company, Dallas, Tex.

[22] Filed: Dec. 6, 1973

[21] Appl. No.: 422,344

[52] U.S. Cl............... 105/368 R, 74/535, 105/370, 296/1 A
[51] Int. Cl............................................. B61d 3/02
[58] Field of Search......... 105/368 R, 370; 296/1 R, 296/1 A; 214/512; 74/519, 533, 534, 540, 541, 535, 527, 469

[56] References Cited
UNITED STATES PATENTS

| | | | |
|---|---|---|---|
| 1,223,084 | 4/1917 | McManus | 74/535 |
| 3,426,704 | 2/1969 | Blunden | 105/368 R |
| 3,449,010 | 6/1969 | Hoy | 105/368 R X |

Primary Examiner—M. Henson Wood, Jr.
Assistant Examiner—Gene A. Church
Attorney, Agent, or Firm—Cushman, Darby & Cushman

[57] ABSTRACT

A pivotally mounted control lever protrudes out through a vertically slotted locking plate which has a plurality of vertically spaced laterally extending notches, each for receipt of the lever for maintaining the lever at a selected position. An eccentric cam is pivotally mounted on the control lever to prevent sufficient lateral movement of the control lever as to permit its withdrawal from a slot in which it is positioned unless the cam is manually rotated forwardly and upwardly. The cam is conveniently so located that it can be grasped without having to reach through the locking plate.

3 Claims, 4 Drawing Figures

SWING DECK LOCKING DEVICE

BACKGROUND OF THE INVENTION

Many automobiles shipped by rail travel on tri-level rail cars which include bottom and top deck decks which are fixed in height and a center deck which may be raised and lowered a few inches to facilitate loading and unloading automobiles from the bottom deck.

The U.S. Pat. of Blunden, No. 3,426,704, issued Feb. 11, 1969 illustrates a tri-level rail car which includes a locking structure used for locking the adjustable height deck in a raised or lowered position. A cam member 64, best illustrated in FIGS. 3, 6 and 7 thereof, is used to block the movement of that deck.

The patent to McManus, et al., U.S. Pat. No. 1,223,084 of Apr. 17, 1917 illustrates a control lever lock in which a sliding member mounted on the control lever engages the side of the housing 6 and prevents the control lever from being moved to the left as illustrated in FIG. 1. It is necessary to move the locking member up the control lever to disengage it from the housing to permit the control lever to be moved over the left and then into the slot 7.

The patent to Moorman, U.S. Pat. No. 2,260,633 of Oct. 28, 1941, in FIG. 4, shows a means for locking a control lever in one of two positions by means of the rod 10 mounted on the plate 36. This rod prevents the handle from being moved from one side of the control gate to the other.

The patent to Coldwell, U.S. Pat. No. 902,558 of Nov. 3, 1908 pertains to the use of blocking devices mounted on a control gate rather than on a lever to prevent the lever from being pulled into sections of the control gate inadvertently.

The present invention arose as a solution to the desire to provide a rugged, simple to operate, easy to adapt means for operating an adjustable height deck. However, the tri-level rail car and the adjustable height deck including its springing and counterbalancing are not a part of the present invention. Despite the special end use which led to development of the present invention, the control lever locking device can be employed with no modification in other contexts.

SUMMARY OF THE INVENTION

A pivotally mounted control lever protrudes out through a vertically locking plate which has a plurality of vertically spaced laterally extending notches, each for receipt of the lever for maintaining the lever at a selected position. An eccentric cam is pivotally mounted on the control lever to prevent sufficient lateral movement of the control lever as to permit its withdrawal from a slot in which it is positioned unless the cam is manually rotated forwardly and upwardly. The cam is conveniently so located that it can be grasped without having to reach through the locking plate.

The principles of the invention will be further hereinafter discussed with reference to the drawings wherein preferred embodiments are shown. The specifics illustrated in the drawings are intended to exemplify, rather than limit, aspects of the invention as defined in the claims.

Figure 1:
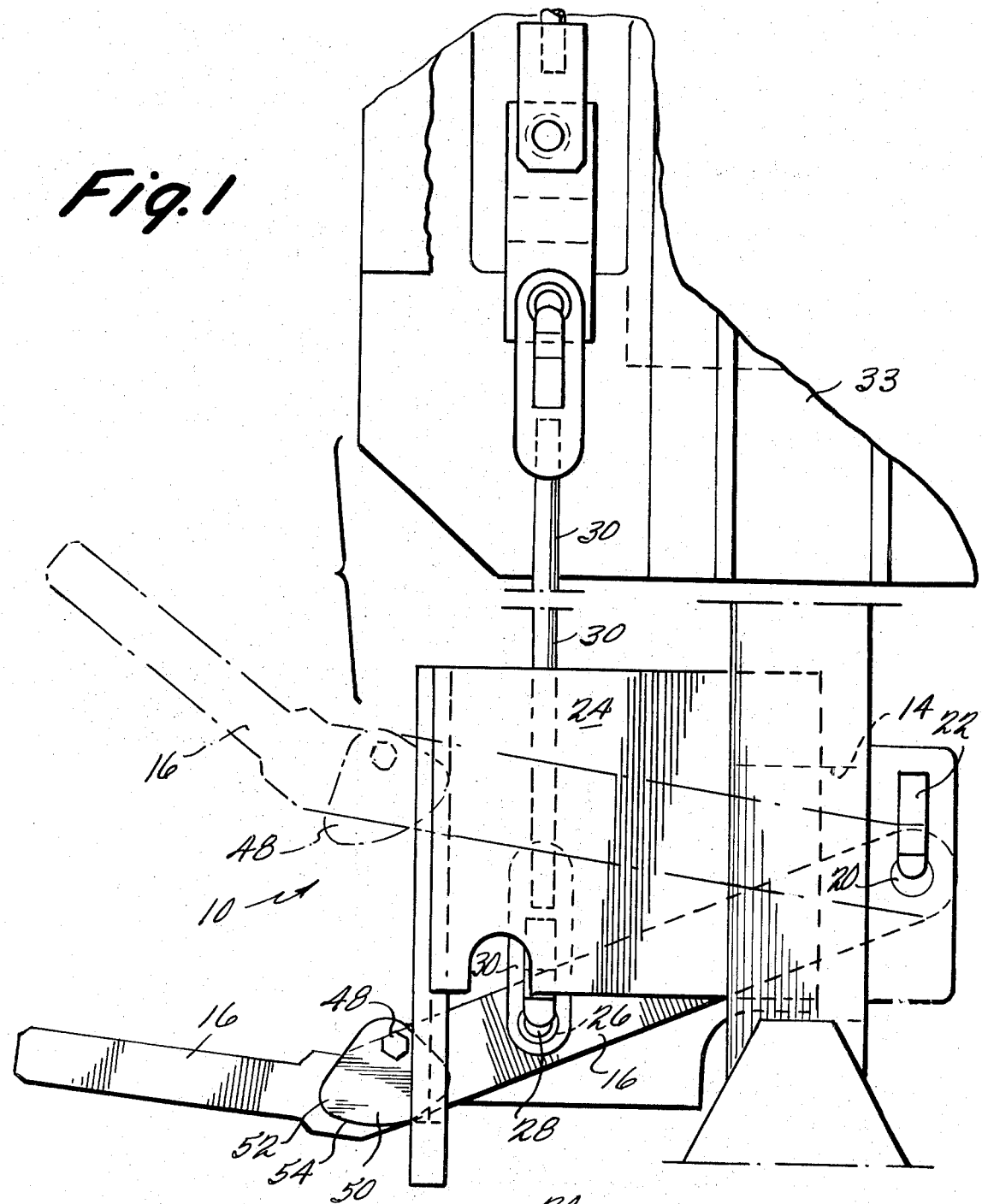
FIG. 1 is a side elevation view of an embodiment of the device.
Figure 2:
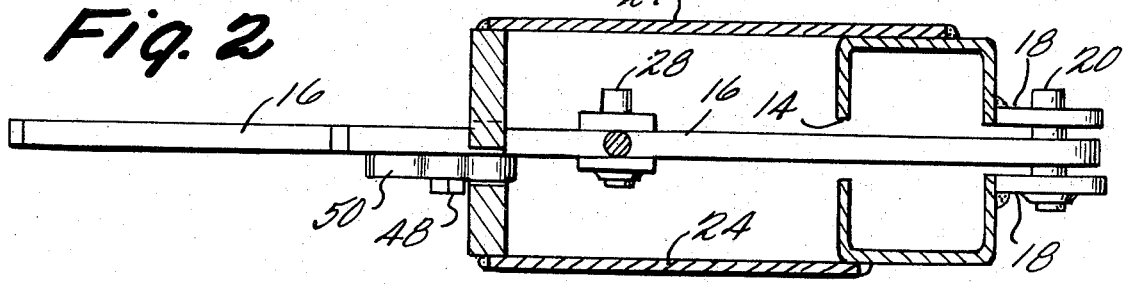
FIG. 2 is a horizontal sectional view taken on line 2—2 of FIG. 1.

Detailed Description of The Presently Preferred Embodiment

In the embodiment depicted, the device 10 is mounted on an end column 12 of a tri-level rail car (FIG. 4), the column being slotted at 14 therethrough from front to back to pass the operating lever 16. A pair of transversely spaced anchor plates 18 are secured on the side of the column 12 which faces the remainder of the length of the rail car. The anchor plates 18 provided with openings aligned transversely of the car which mount a pivot pin 20, whose retention is assured by a tab 22 welded to the anchor plate 18 adjacent the head of the pin 20 and extends to closely overlie the head.

Figure 3:
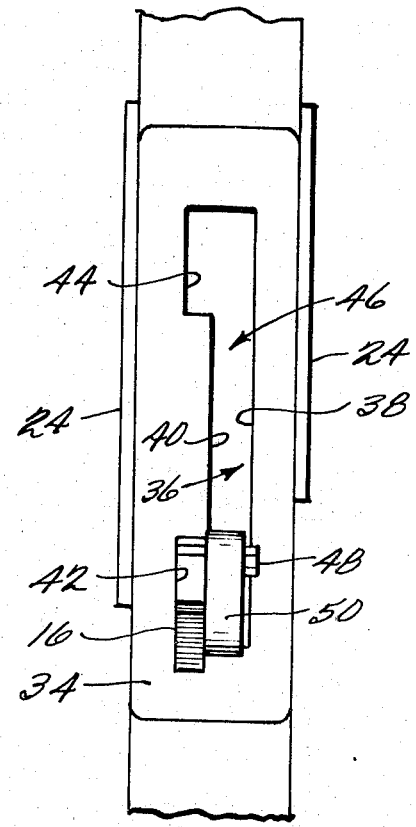
FIG. 3 is a front elevation view of the same embodiment.

The device 10 is shown further including two transversely spaced, vertically oriented plates 24 protruding from the opposite side of column 12 from the anchor plates 18. The plates 24 flank the operating lever intermediate its extent. Between the plates 24 the operating lever is provided with a transverse opening 26 which accommodates the pivot pin 28 of a control rod assembly 30 which extends upwardly to operative connection at 32 (FIG. 4) with the rail car adjustable middle level 33 for adjusting the level thereof as the operating lever 16 is raised and lowered about its pivot 20. The outer vertical edges of the plates 24 are secured to the side edges of a locking plate 34 (FIG. 3). The locking plate 34 is provided with a vertical slot 36 which extends through its thickness. The slot 36 has one vertical border 38 which is straight sided and another, 40, which has a plurality of vertically spaced, squared notches 42, 44 which are contiguous with the main vertical run 46 of the slot 36 and which open toward the straight side 38. Two such notches are shown, at opposite vertical extremes of the slot. More intermediate ones could be provided were they needed.

The operating lever protrudes out through the slot 36 so it can be grasped for actuation.

As a matter of considerable importance to gaining an appreciation for the invention, it should now be noticed that right close to where the lever 16 passes through the slot 36, the lever is provided with a further transverse opening into which a bolt 48 is threaded to hangingly mount a locking cam 50 on one face of the lever at such a position that when the lever is stationed in any notch 42, 44, the locking cam 50 occupies the straight run 46 of the slot beside that notch. The thickness of the composite of the hanging cam 50 and lever 16 is such, compared to the width of the slot including the respective notch, that the lever cannot be laterally moved from the notch into the main vertical run 46, unless the cam is pivoted about the axis 48 sufficiently to remove the cam from being within the slot. It should further be observed that the cam is eccentrically mounted so that when it merely hangs it protrudes substantially into the slot, but that enough of it projects forwardly of the locking plate 34 that the protruding part 52 can be easily grasped and pivoted outwardly without necessitating reaching into the slot. The perimeter 54 of the cam is smoothly curved, all around, minimizing the prospect that the cam might catch on something and not hang as desired. In a preferred form, the cam is generally triangular, with both the sides and apices being rounded and the hanging point being about one-fourth the distance along one side from one apex and about the same amount from the edge toward the center of the cam. What is important about the cam is that it:

a. normally hangs in the main vertical run of the slot;
b. be manually accessible from outside the exterior of the locking plate;
c. be smooth surfaced to prevent its catching in a non-operating position or becoming caught in the slot;
d. easily move to an operating position by itself; and
e. be rugged.

Figure 4:
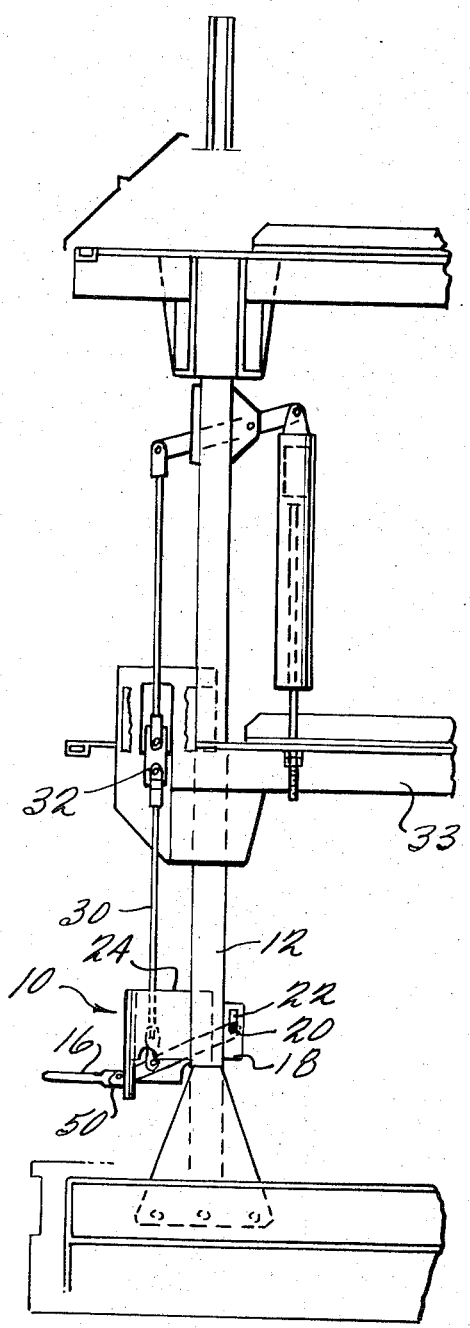
FIG. 4 is a smaller scale side elevation view of the device of FIG. 1 installed in the context of a tri-level automobile transport rail car, being one of the four such devices, installed at the respective corners of the rail car.

From FIG. 4 is should be apparent that when the operating handle is moved from one notch to the other, the control rod assembly 30 is vertically moved for adjusting the rail car's middle level 33. As expressed above, the adjustable middle level is not part of the present invention. The mechanics of a way one may be mounted for adjustability are disclosed in the aforementioned Blunden patent.

The device 10, apart from the pivotal connections described, where secured together and mounted is preferably fabricated by welding steel plate together.

It should now be apparent that the control lever locking device as described hereinabove possesses each of the attributes set forth in the specification under the heading "Summary of the Invention" hereinbefore. Because the control lever locking device of the invention can be modified to some extent without departing from the principles of the invention as they have been outlined and explained in this specification, the present invention should be understood as encompassing all such modifications as are within the spirit and scope of the following claims.

I claim:

1. A control lever locking device, comprising:
a locking plate having means defining a vertically elongated slot which includes a vertically elongated main run bounded at one lateral extent by a straight side and at the other by means defining a plurality of vertically spaced notches which open toward the straight side;
an operating lever;
fixed means behind the slot pivotally mounting the operating lever;
said operating lever protruding out through the slot for manual movement up and down the main run of the slot, the operating lever being sized and constructed to be laterally movable between the main run of the slot and each notch when at the respective level thereof;
means on the operating lever for connecting the lever to whatever is to be actuated upon movement of the operating lever up and down in the slot;
pivot pin means extending laterally from the operating lever toward said straight side near the locking plate;
a cam pivotally hanging from said pivot pin and normally extending substantially in the main run of said slot and forwardly of the locking plate, the cam being positioned to be manually grasped and pivoted forwardly and upwardly about the pivot pin means to clear the main run of the slot;
the composite thickness of the cam and the operating lever where the cam is mounted, compared to the width of the slot being such that:
 a. the cam cannot be in the main run of the slot unless the operating lever is stationed in one of said notches;
 b. the operating lever when stationed in one of said notches cannot be removed therefrom unless the cam is pivoted forwardly and upwardly as aforesaid; and
 c. when the operating lever is moved from the main run to one of said notches, the cam pivots into the main run of the slot under the influence of gravity.

2. The control lever locking device of claim 1 wherein the cam comprises a generally triangular plate which is convexly curved along the whole of the periphery thereof, said pivot pin means mounting the cam near one apex thereof and said pivot pin means being disposed in front of the locking plate.

3. The control lever locking device of claim 1 wherein said connecting means comprises another lateral pivot pin means mounted on the control lever at a point spaced thereon from said fixed means, and a connecting rod assembly pivotally mounted at one end on the last mentioned pivot means, and extending from its mounting at an angle to the control lever so that when the control lever is moved up and down in the slot, the opposite end of the connecting rod is consequently moved also, for adjusting whatever is connected to said opposite end of the connecting rod assembly.

* * * * *